(12) United States Patent
Detert

(10) Patent No.: US 10,027,517 B2
(45) Date of Patent: *Jul. 17, 2018

(54) MEASURING DEVICE AND METHOD

(71) Applicant: Rohde & Schwarz GmbH & Co. KG, Munich (DE)

(72) Inventor: Thorben Detert, Munich (DE)

(73) Assignee: ROHDE SCHWARZ GMBH & CO. KG, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/442,264

(22) Filed: Feb. 24, 2017

(65) Prior Publication Data

US 2017/0163455 A1    Jun. 8, 2017

Related U.S. Application Data

(63) Continuation of application No. 14/900,019, filed as application No. PCT/EP2014/059559 on May 9, 2014, now Pat. No. 9,641,365.

(30) Foreign Application Priority Data

Jun. 25, 2013  (DE) .................. 10 2013 212 067

(51) Int. Cl.
*H04L 27/06*  (2006.01)
*H04B 17/21*  (2015.01)

(52) U.S. Cl.
CPC ............ *H04L 27/06* (2013.01); *H04B 17/21* (2015.01)

(58) Field of Classification Search
CPC ............ H04B 1/302; H04B 1/68; H04B 3/32; H04B 3/46; H04B 3/487; H04B 3/493;
(Continued)

(56) References Cited

U.S. PATENT DOCUMENTS 5,166,924 A    11/1992  Moos
5,323,337 A *  6/1994  Wilson .................. H04B 1/1027
                                                        702/73
(Continued)

FOREIGN PATENT DOCUMENTS

DE           60030093 T2    3/2007
DE        102007037105 A1   11/2008
(Continued)

OTHER PUBLICATIONS

International Preliminary Report on Patentability for International Application No. PCT/EP2014/059559, dated Jan. 7, 2016, 1 Page.
(Continued)

*Primary Examiner* — Young T Tse
(74) *Attorney, Agent, or Firm* — Ditthavong & Steiner, P.C.

(57) ABSTRACT

A measuring device serves for the detection of a simultaneous presence of at least a first signal and a second signal in a measurement signal. The measuring device contains a receiver for receiving the measurement signal as a digital measurement signal and a processor. This processor includes a transformer for transforming the digital measurement signal into a measurement signal in the frequency domain. The processor further contains a subtractor for subtracting the first sideband of the measurement signal in the frequency domain from a second sideband of the measurement signal in the frequency domain. In this context, the subtractor generates a residual signal.

18 Claims, 4 Drawing Sheets

(58) Field of Classification Search
CPC ........ H04B 17/00; H04B 17/20; H04B 17/21;
H04B 17/29; H04L 1/20; H04L 1/206;
H04L 1/24; H04L 27/0024; H04L 27/02;
H04L 27/06
USPC ....... 375/224, 225, 227, 260, 270, 316, 321,
375/340; 370/208, 210, 241, 248, 252;
455/203, 204, 226.1, 226.2, 226.3
See application file for complete search history.

(56) References Cited

U.S. PATENT DOCUMENTS

| | | | | |
|---|---|---|---|---|
| 6,078,281 | A * | 6/2000 | Milkovich | G01S 7/2926 342/162 |
| 6,405,147 | B1 * | 6/2002 | Fera | G01R 31/2837 702/108 |
| 6,573,948 | B1 * | 6/2003 | Limberg | H04L 25/03987 348/614 |
| 6,961,372 | B2 | 11/2005 | Liang | |
| 7,619,964 | B2 * | 11/2009 | Son | H04L 27/265 370/210 |
| 8,385,449 | B2 | 2/2013 | Lipp | |
| 2004/0021514 | A1 | 2/2004 | Ring | |
| 2005/0055219 | A1 | 3/2005 | Accardi et al. | |
| 2008/0240414 | A1 | 10/2008 | Mohammad et al. | |

FOREIGN PATENT DOCUMENTS

| | | |
|---|---|---|
| DE | 102011080999 A1 | 2/2013 |
| EP | 1160978 A1 | 12/2001 |
| WO | 2014206623 A1 | 12/2014 |

OTHER PUBLICATIONS

Written Opinion of the International Searching Authority for International Application No. PCT/EP2014/059559, dated Jan. 7, 2016, 10 Pages.

Notification of Transmittal of Translation of the International Preliminary Report on Patentability (Chapter I or Chapter II) for International Application No. PCT/EP2014/059559, dated Jan. 7, 2016, 1 Page.

Kadar, "An Analysis of Helicopter Rotor Modulation Interference", IEEE Transactions on Aerospace and Electronic Systems, vol. AES-9, No. 3, May 1973, 8 Pages.

Feng et al., "Application of Subband Spectral Cancellation for SAR Narrow-Band Interference Suppression", IEEE Geoscience and Remote sensing letters, vol. 9, No. 2, Mar. 2012, 4 Pages.

* cited by examiner

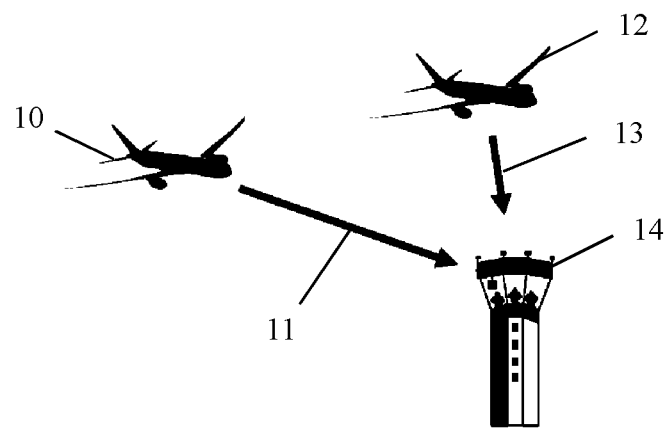
Fig. 1
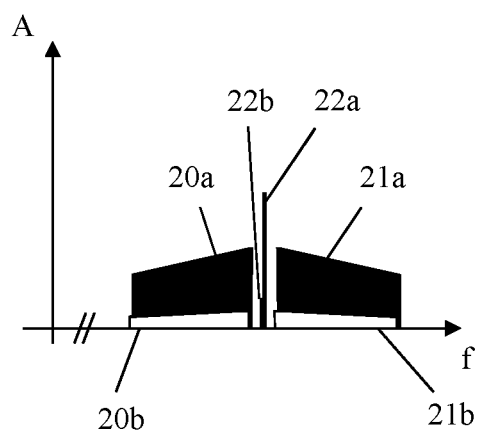 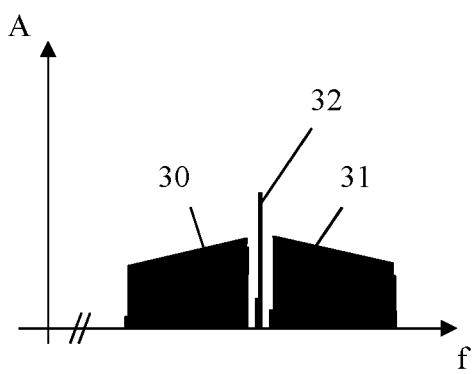
Fig. 2a              Fig. 2b

MEASURING DEVICE AND METHOD

CROSS-REFERENCE TO RELATED APPLICATIONS

The present application is a Continuation application of U.S. application Ser. No. 14/900,019, filed Dec. 18, 2015, now U.S. Pat. No. 9,641,365, which is a national phase application of PCT Application No. PCT/EP2014/059559, filed May 9, 2014, which claims priority to German Patent Application No. 10 2013 212 067.2, filed on Jun. 25, 2013, the entire contents of which are herein incorporated by reference.

TECHNICAL FIELD

The invention, according to the various embodiments described herein, relates to a measuring device and a measuring method for detecting a simultaneous presence of at least a first signal and a second signal in a measurement signal.

BACKGROUND

Amplitude-modulated signals are still conventional in airborne communications systems. A major problem with the use of such signals is that, in the case of a random simultaneous transmission of signals, for example, by two aircraft, the relatively weaker signal arriving in the receiver remains undetected. This can lead to errors relevant to safety.

A method in which a received signal is distorted in a non-linear manner and then transformed into the frequency domain in order to detect such double transmissions is known. Symmetrical spectral components in the distorted spectrum are then determined and removed. On the basis of still remaining signal components, an inference is then made about the presence of a simultaneously transmitted second signal. For example, the German published patent application DE 10 2011 080 999 A1 discloses a method with non-linear distortion, as described above.

However, this method is disadvantageous because it requires a large computational effort as a result of the non-linear distortion. This is also problematic when using CLIMAX operating mode. It is not capable of distinguishing between several transmitters in the case of the common-wave operation of the CLIMAX system and an actual double transmission worthy of detection.

SUMMARY

Accordingly, there is provided a simple and reliable measuring device and measuring method which are capable of detecting double transmissions reliably.

The measuring device serves to detect a simultaneous presence of at least a first signal and a second signal in a measurement signal, preferably a received signal of a radio device in the context of airborne communications. The measuring device contains a receiver for receiving the measurement signal as a digital measurement signal and a processor. In this context, the processor includes a transformer for transforming the digital measurement signal into a measurement signal in the frequency domain. The processor further contains a subtractor for subtracting a first sideband of the measurement signal in the frequency domain from a second sideband of the measurement signal in the frequency domain. In this context, the two sidebands refer to the same signal component—around the strongest carrier. Accordingly, the subtractor generates a residual signal. It is therefore possible to infer the presence of a double transmission very easily on the basis of the residual signal.

In certain embodiments, only the receiver processes the measurement signal before digitisation by the receiver. The receiver then processes the measurement signal only by means of linear operations, before it digitises the measurement signal to form the digital measurement signal. Since no non-linear operations are necessary, a very economical processing in terms of computational resources can be guaranteed.

The first signal and the second signal are preferably amplitude-modulated signals in each case with a carrier. Accordingly, the transmission method used predominantly in airborne communications can be employed.

In certain embodiments, the subtractor is embodied to detect a strongest carrier present in the measurement signal, wherein the sidebands of the measurement signal are separated by the strongest carrier present in the measurement signal. Accordingly, a reliable distinction between the sidebands to be subtracted can be guaranteed.

The subtractor can be embodied to reflect one of the sidebands of the measurement signal in the frequency domain to a position of a strongest carrier present in the measurement signal before the subtraction. In this manner, a reliable function of the measuring device is achieved for arbitrary transmission signals.

The processor advantageously contains a detector for detecting the presence of the second signal in the measurement signal on the basis of remaining signal components of the residual signal. In this manner, an automatic evaluation, which is very simple for the user of the measuring device, can be achieved.

The detector can be embodied to determine the presence of the second signal in the measurement signal by means of a threshold-value comparison of remaining signal components or by means of a threshold-value comparison of a signal derived from the signal components remaining in the residual signal. That is to say, a comparison of the derived payload signal with the noise is implemented. A very simple detection can be ensured in this manner.

The detector can be embodied to determine the presence of the second signal in the measurement signal by means of a threshold-value comparison of summated powers of remaining signal components in the residual signal. In this manner, the presence of the second signal can be detected with increased accuracy.

The detector can be embodied to detect rotor modulations of the first signal and/or of the second signal, and to remove detected rotor modulations of the first signal and/or of the second signal from the first signal or respectively from the second signal. As an alternative, it is embodied to ignore detected rotor modulations of the first signal and/or of the second signal in detecting the presence of the second signal in the measurement signal. Accordingly, errors caused by rotor modulations can be avoided in the detection of a double transmission.

A measuring method according to the invention serves for the detection of a simultaneous presence of at least a first signal and a second signal in a measurement signal. In this context, the measurement signal is received as a digital measurement signal. Following this, the digital measurement signal is transformed into a measurement signal in the frequency domain. This is followed by a subtraction of a first sideband of the measurement signal in the frequency domain from a second sideband of the measurement signal in the frequency domain, wherein, in this context, a residual signal is generated. On the basis of the residual signal, it is very easy to infer the presence of a double transmission.

By preference, the measuring device according to the invention and the measuring method according to the invention can detect double transmissions in the case of a level difference between the two signals from 0 to 20 dB, by particular preference from 0 to 40 dB. Accordingly, even in the case of a very strong and a very weak signal, a reliable detection of a double transmission is possible.

By particular preference, the measuring device and the measuring method are suitable for distinguishing actual double transmissions of different participants from supposed double transmissions in the CLIMAX method.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

In the following, the invention is described by way of example with reference to the drawings in which an advantageous exemplary embodiment is presented. The drawings show:

FIG. 1 a schematic presentation of the problem underlying the present invention;

FIG. 2a a spectral presentation of two simultaneously transmitted signals in the frequency domain;

FIG. 2b a spectral summated presentation of the simultaneously transmitted signals from FIG. 2a;

DETAILED DESCRIPTION

Figure 3:
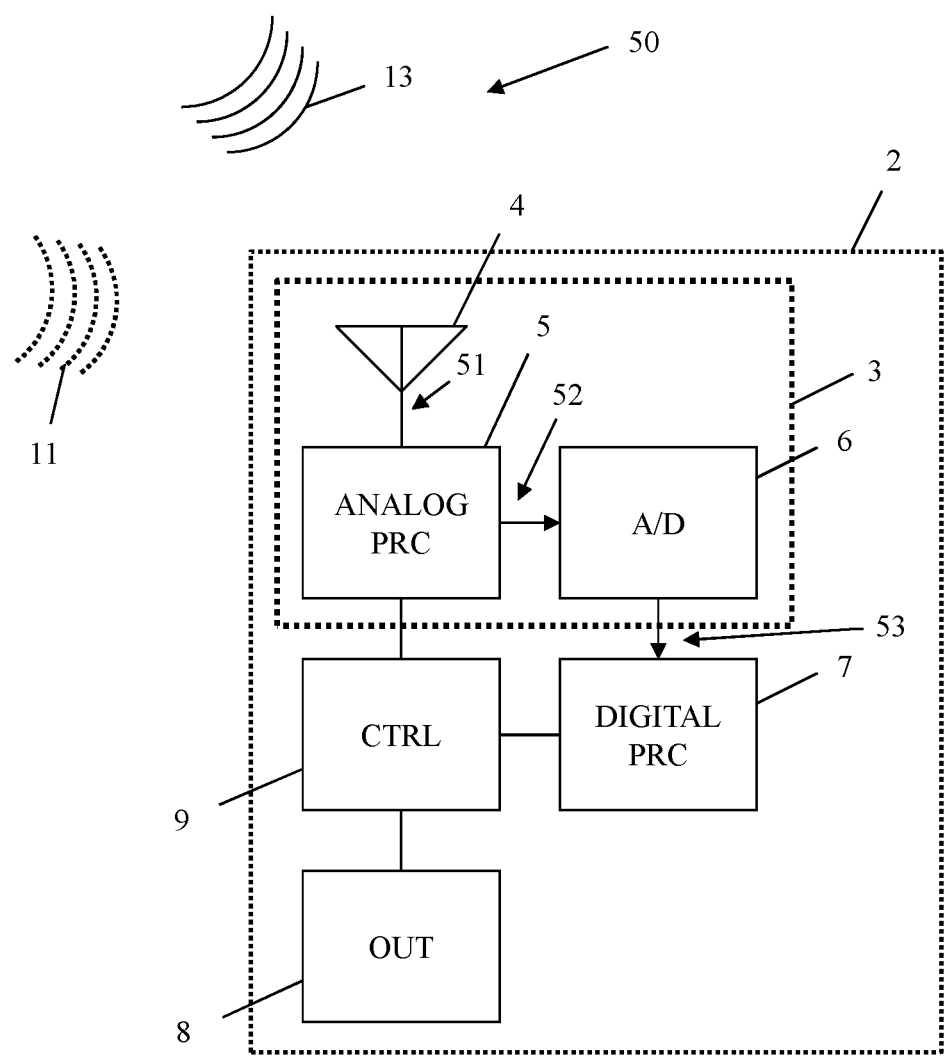
FIG. 3 an exemplary embodiment of the measuring device according to the invention in a block-circuit diagram.

Initially, the problem underlying the present invention will be explained with reference to FIGS. 1-2b. Following this, an exemplary embodiment of the measuring device according to the invention and its function will be explained in detail with reference to FIGS. 3-4. Finally, with reference to FIG. 6, the functioning of an exemplary embodiment of the method will be explained. In similar drawings, the presentation and description of identical elements has not been repeated in some cases.

FIG. 1 shows the problem underlying the invention in a schematic manner. A first aircraft 10 transmits a first signal 11 to a receiver 14. At the same time, a second aircraft 12 transmits a second signal 13 to the receiver 14. Because of the significantly shorter distance of the second aircraft 12 from the receiver 14, the second signal 13 arrives in the receiver 14 with a significantly higher level than the first signal 11. Because of the amplitude modulation and the use of the nominally identical transmission frequency, the first signal 11 disappears within the relatively stronger second signal 13 and cannot be detected without further measures by the receiver 14. Accordingly, a message transmitted from the aircraft 10 to the receiver 14 does not arrive. Of course, the measuring device according to the invention and the measuring method according to the invention can also be used in the case of different configurations of participants. For example, a double transmission of an aircraft and a ground station is also conceivable in the case of reception by an aircraft or a ground station. Expressed in general terms, each of the participants presented can be replaced by an aircraft or a ground station.

FIG. 2a presents the situation illustrated in FIG. 1 in the frequency domain. Here, the left sideband 20b, the right sideband 21b and the carrier 22b correspond to the first signal 11 from FIG. 1. The left sideband 20a, the right sideband 21a and the carrier 22a here correspond to the second signal 13 from FIG. 1. It is clearly evident here that the components corresponding to the first signal 11 include a significantly lower level than the components corresponding to the second signal 13. That is to say, the components of the first signal 11 disappear into the second signal 13.

FIG. 2b shows a total signal arriving in the receiver 14 from FIG. 1 in a spectral view. A slight asymmetry of the total signal presented in FIG. 2b is obtained as a result of slight frequency differences between the two signals. A left sideband and a right sideband 31 can be detected around a recognisable central carrier 32. The contributions of the first signal 11 from FIG. 1 are hardly detectable here. Only in the lower left region of the left sideband 30 and of the right sideband 31 and at the bottom of the carrier 32, minor differences are detectable by comparison with a single signal. However, it is not possible to infer a double transmission directly from these regions. Of course, the entire received signal may also contain only one payload signal, for example, the first signal 11 or the second signal 13 and noise. Within the scope of the double-transmission detection, this case must be distinguished from the case described above.

FIG. 3 shows an exemplary embodiment of the measuring device according to the invention in a block circuit diagram. Together, the first signal 11 from FIG. 1 and the second signal 13 from FIG. 1 form a measurement signal 50. The measuring device 2 contains a receiver 3, a digital processor t 7, an output 8 and a controller 9. The receiver 3 further contains an antenna 4, an analog-processor 5 and an analog-digital converter 6. In this context, the antenna 4 is connected to the analog-processor 5, which is connected in turn to the analog-digital converter 6. This, in turn, is connected to the digital processor 7. In this context, the analog-processor 5, the digital processor 7 and the output 8 are further connected to a controller 9. Here, only the components of the measuring device relevant for the invention have been shown. Conventional receiving technology, as used in an airborne radio device, has not been shown in detail here.

The measurement signal 50, which contains at least one signal, for example, from an aircraft—but which can, in the case of a double transmission, alternatively contain a first and a second signal—is received by the antenna 4 and transmitted to the analog-processor 5 as a received signal 51. The latter performs analog-processing steps, such as a filtering and an amplification, and outputs a processed measurement signal 52 to the analog-digital converter 6. The latter digitises the signal and transmits it to the digital processor 7 as a digital measurement signal 53. The latter performs a detection of the double transmission and communicates the result to the controller 9. In the case of a double transmission, the controller 9 controls the output 9 in order to indicate the double transmission, for example, with an acoustic warning signal or a visual warning signal. The analog-processor 5, the digital processor 7 and the output 8 are therefore controlled by the controller 9. The detailed functioning of the digital processor 7 will be explained in greater detail with reference to FIG. 4.

Figure 4:
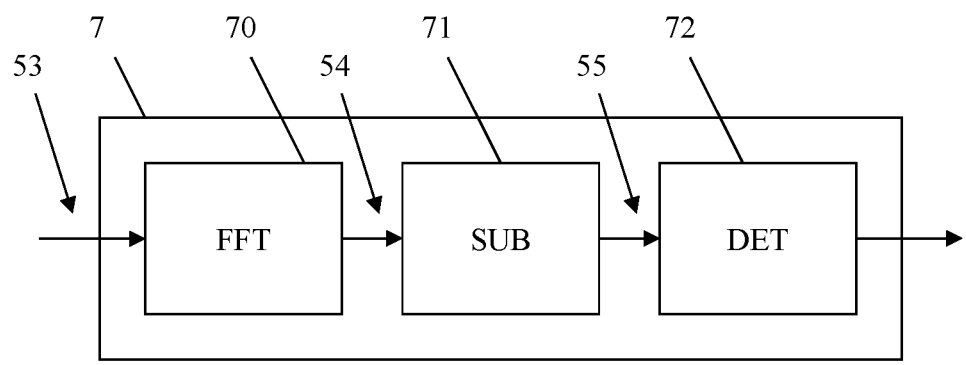
FIG. 4 a detail view of the exemplary embodiment of the measuring device according to the invention in a block-circuit diagram.

FIG. 4 shows a detail view of the digital processor 7 from FIG. 3. The digital-processor 7 receives the digital measurement signal 53 from the analog-digital converter 6. The digital-processor 7 contains a transformer 70, a subtractor 71 and a detector 72. This transformer 70 is connected to the analog-digital converter 6 from FIG. 3. The subtractor 71 is connected to the transformer 70 and to the detector 72. The detector 72 is connected to the controller 9 from FIG. 3. The digital measurement signal is supplied to the transformer 70 and transformed by the latter into a measurement signal in the frequency domain 54. For this purpose, a Fast Fourier Transform is used by way of example. The measurement signal in the frequency domain 54 accordingly corresponds to the total signal illustrated in FIG. 2b. The measurement signal in the frequency domain 54 is then supplied to the subtractor 71, which subtracts a first sideband of the total signal from a second sideband of the total signal.

Since both of the sidebands of an amplitude-modulated signal are symmetrical relative to the carrier, a complete deletion of the signal is obtained here if only one signal was part of the measurement signal. However, this asymmetry cannot be detected in FIG. 2b without further steps. In particular, FIG. 2b shows an ideal signal without noise. In a real signal, the slight asymmetries of the signal from FIG. 2b would disappear into the relatively stronger signal.

The subtractor 71 accordingly first determines the precise carrier position in the frequency range of the measurement signal in the frequency domain 54. Following this, a reflection of one sideband to this determined carrier position is implemented. The reflected sideband is subtracted from the non-reflected sideband. A resulting residual signal 55 in the case of a double transmission is illustrated in FIG. 5.

A residual signal 55 generated in this manner is then transmitted to the detector 72, which infers from the signal component present in the residual signal 55 the presence or absence of a double transmission. For example, a threshold-value comparison can be used for this purpose. As an alternative, the residual signal 55 can first be processed, for example, through magnitude formation or power formation. The processed residual signal can then be investigated by means of a threshold-value comparison. If the threshold is exceeded, the presence of a double transmission can be inferred, and this can be communicated to the controller 9 from FIG. 3. The absence of a double transmission is also communicated to the controller 9.

With existing systems for detecting double transmissions, rotor modulations, that is, modulations which result from the rotating rotor blades in a propeller-driven aircraft, are often detected as double transmissions. Such rotor modulations generate periodic continuations of the transmitted signal in the frequency domain. In this context, the periodicity is specified by the number of blades of the rotor and the speed of rotation. In order to exclude such rotor modulations and therefore avoid detecting them as double transmissions, the detector 72 additionally performs a rotor-modulation compensation. In this case, the detector 72 searches in a targeted manner for rotor modulations, which are detected on the basis of the known periodicity, and removes these periodic repetitions of the signal in the frequency domain before the threshold-value comparison is implemented.

Figure 5:
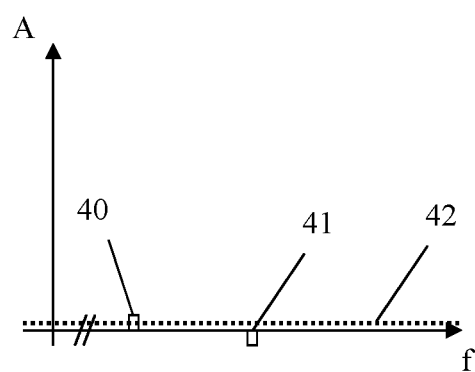
FIG. 5 a spectral presentation of a signal used by the exemplary embodiment of the measuring device.

FIG. 5 shows the residual signal 55 from FIG. 4 in the case of a double transmission. The residual signal 55 here contains two signal components 40, 41, which correspond to the hardly detectable asymmetries of the total signal in FIG. 2b. After the symmetrical signal components have been removed, these asymmetric signal components can now easily be detected. A threshold value 42 has also been drawn into FIG. 5, on the basis of which, for example, the presence of the double transmission is detected.

Figure 6:
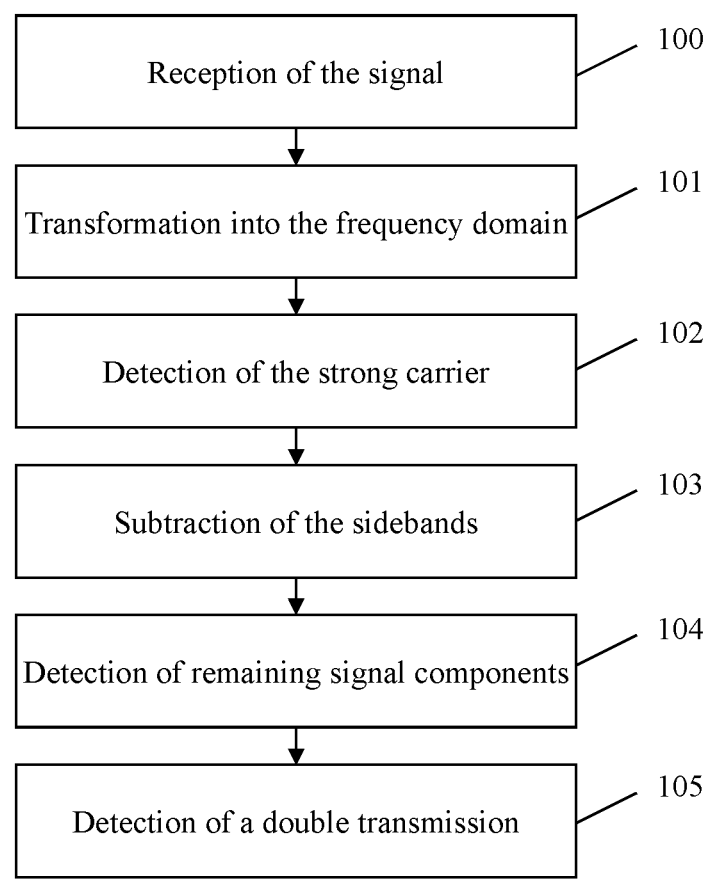
FIG. 6 an exemplary embodiment of the measuring method according to the invention in a flow diagram.

FIG. 6 shows an exemplary embodiment of the method according to the invention. In a first step 100, a measurement signal is received. This measurement signal contains at least a first signal, but optionally contains a second signal. In a second step 101, the measurement signal is transformed into the frequency domain. In a third step 102, a strongest carrier within the received signal is detected. In a fourth step 103, the two sidebands which are defined by the two spectral sides of the detected strongest carrier, are subtracted from one another. In this context, one of the sidebands is first reflected to the carrier position. In a fifth step 104, remaining signal components are detected after the subtraction. In a sixth step 105, a double transmission is determined. With regard to the function of the individual steps, reference is made to the corresponding paragraphs relating to FIG. 3 and FIG. 4.

The invention is not restricted to the exemplary embodiment presented. Advantageously, all of the features described or features illustrated in the figures can be combined arbitrarily with one another within the scope of the invention.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A measuring device for processing an input measurement signal, the measuring device comprising:
   a receiver configured to receive the input measurement signal to generate a digital measurement signal; and
   a digital processor including:
      a transformer configured to transform the digital measurement signal into a processed measurement signal in a frequency domain, and
      a subtractor configured to subtract a first sideband of the processed measurement signal in the frequency domain from a second sideband of the processed measurement signal in the frequency domain to generate a residual signal,
      wherein the subtractor is further configured to detect a strongest carrier present in the processed measurement signal,
      wherein the first and second sidebands of the processed measurement signal are separated by the strongest carrier present in the processed measurement signal, and
      wherein the receiver is further configured to process the input measurement signal only by linear operations before it digitises the input measurement signal to form the digital measurement signal.

2. The measuring device according to claim 1, wherein the subtractor is further configured to reflect one of the first and second sidebands of the processed measurement signal in the frequency domain before the subtraction to a position of the strongest carrier present in the processed measurement signal.

3. The measuring device according to claim 1, the measuring device being configured to detect a simultaneous presence of at least a first signal and a second signal in the input measurement signal,
wherein the digital processor further comprises a detector configured to detect a presence of the second signal in the processed measurement signal on the basis of remaining signal components of the residual signal.

4. The measuring device according to claim 3, wherein the detector is further configured to determine the presence of the second signal in the processed measurement signal by a threshold-value comparison of the remaining signal components in the residual signal or by a threshold-value comparison of summated powers of the remaining signal components in the residual signal.

5. The measuring device according to 3, wherein the detector is further configured to detect rotor modulations of the first signal and/or of the second signal.

6. The measuring device according to 5, wherein the measuring device is further configured to:
remove the detected rotor modulations of the first signal or of the second signal from the first signal or respectively from the second signal.

7. The measuring device according to 5, wherein the measuring device is further configured to:
ignore the detected rotor modulations of the first signal or of the second signal in the detection of the presence of the second signal in the processed measurement signal.

8. A measuring method for processing an input measurement signal, the measuring method comprising steps of:
receiving the input measurement signal;
generating a digital measurement signal based on the input measurement signal,
wherein the input measurement signal is processed only by linear operations before the input measurement signal is digitised to form the digital measurement signal;
transforming the generated digital measurement signal into a processed measurement signal in a frequency domain;
subtracting a first sideband of the processed measurement signal in the frequency domain from a second sideband of the processed measurement signal in the frequency domain to generate a residual signal; and
detecting a strongest carrier present in the processed measurement signal,
wherein the first and second sidebands of the processed measurement signal are separated by the strongest carrier present in the processed measurement signal.

9. The measuring method according to claim 8, wherein before the subtraction, one of the first and second sidebands of the processed measurement signal in the frequency domain is reflected to a position of the strongest carrier present in the processed measurement signal.

10. The measuring method according to claim 8,
wherein the detecting is directed to detecting a simultaneous presence of at least a first signal and a second signal in the input measurement signal, and
wherein a presence of the second signal in the processed measurement signal is detected on the basis of remaining signal components of the residual signal.

11. The measuring method according to claim 10, wherein the presence of the second signal in the processed measurement signal is determined by a threshold-value comparison of the remaining signal components in the residual signal or by a threshold-value comparison of summated powers of the remaining signal components in the residual signal.

12. The measuring method according to claim 10, wherein:
rotor modulations of the first signal or of the second signal are detected, and
the detected rotor modulations of the first signal or of the second signal are removed from the first signal or respectively from the second signal, or
the detected rotor modulations of the first signal or of the second signal are ignored in the detection of the presence of the second signal in the processed measurement signal.

13. A measuring device for processing an input measurement signal, the measuring device comprising:
a receiver configured to receive the input measurement signal to generate a digital measurement signal; and
a digital processor including:
a transformer configured to transform the digital measurement signal into a processed measurement signal in a frequency domain, and
a subtractor configured to subtract a first sideband of the processed measurement signal in the frequency domain from a second sideband of the processed measurement signal in the frequency domain to generate a residual signal,
wherein the subtractor is further configured to reflect one of the first and second sidebands of the processed measurement signal in the frequency domain before the subtraction to a position of a strongest carrier present in the processed measurement signal, and
wherein the receiver is further configured to process the input measurement signal only by linear operations before it digitises the input measurement signal to form the digital measurement signal.

14. The measuring device according to claim 13, the measuring device being configured to detect a simultaneous presence of at least a first signal and a second signal in the input measurement signal,
wherein the first signal and the second signal are amplitude-modulated signals in each case with a carrier, and
wherein the digital processor further comprises a detector configured to detect a presence of the second signal in the processed measurement signal on the basis of remaining signal components of the residual signal.

15. The measuring device according to claim 14, wherein the detector is further configured to determine the presence of the second signal in the processed measurement signal by a threshold-value comparison of the remaining signal components in the residual signal or by a threshold-value comparison of summated powers of the remaining signal components in the residual signal.

16. The measuring device according to claim 14, wherein the detector is further configured to detect rotor modulations of the first signal or of the second signal.

17. The measuring device according to 16, wherein the measuring device is further configured to:

remove the detected rotor modulations of the first signal or of the second signal from the first signal or respectively from the second signal.

18. The measuring device according to 16, wherein the measuring device is further configured to:
ignore the detected rotor modulations of the first signal or of the second signal in the detection of the presence of the second signal in the processed measurement signal.

* * * * *